United States Patent
Ekman et al.

(10) Patent No.: US 10,156,181 B2
(45) Date of Patent: Dec. 18, 2018

(54) COOLING SYSTEM IN A VEHICLE

(71) Applicant: SCANIA CV AB, Södertälje (SE)

(72) Inventors: Mats Ekman, Nykvarn (SE); Mattias Strindlund, Rönninge (SE); Stig Hildahl, Södertälje (SE)

(73) Assignee: SCANIA CV AB (SE)

( * ) Notice: Subject to any disclaimer, the term of this patent is extended or adjusted under 35 U.S.C. 154(b) by 269 days.

(21) Appl. No.: 15/030,433

(22) PCT Filed: Oct. 8, 2014

(86) PCT No.: PCT/SE2014/051179
§ 371 (c)(1),
(2) Date: Apr. 19, 2016

(87) PCT Pub. No.: WO2015/060768
PCT Pub. Date: Apr. 30, 2015

(65) Prior Publication Data
US 2016/0251998 A1    Sep. 1, 2016

(30) Foreign Application Priority Data
Oct. 24, 2013 (SE) ........................... 1351265

(51) Int. Cl.
*F01P 3/12* (2006.01)
*F01P 7/16* (2006.01)
(Continued)

(52) U.S. Cl.
CPC .............. *F01P 3/12* (2013.01); *F01P 7/165* (2013.01); *F01P 2007/146* (2013.01);
(Continued)

(58) Field of Classification Search
CPC ..... F02D 9/06; F01P 3/12; F01P 7/165; F01P 2007/146; F01P 2060/06
(Continued)

(56) References Cited

U.S. PATENT DOCUMENTS 3,650,358 A * 3/1972 Bessiere ................. B60T 1/087
  188/296
5,950,576 A * 9/1999 Busato ....................... F01P 7/16
  123/41.08
(Continued)

FOREIGN PATENT DOCUMENTS

DE    196 41 558 A1    4/1998
DE    102 15 262 A1    10/2003
(Continued)

OTHER PUBLICATIONS

International Search Report dated Feb. 20, 2015 issued in corresponding International patent application No. PCT/SE2014/051179.
(Continued)

*Primary Examiner* — Devon Russell
(74) *Attorney, Agent, or Firm* — Ostrolenk Faber LLP

(57) ABSTRACT

A cooling system in a vehicle includes a cooling fluid pump (3) that circulates cooling fluid in the cooling system, a cooler (5) for the cooling of the cooling fluid, and a valve (10) to lead cooling fluid to the cooler (5) for cooling or to a return line (13) without cooling. A first circuit (6) includes cooling channels (6a) for the cooling of the combustion engine (1) and a second circuit (17) for the cooling of a hydraulic retarder. The first circuit (6) leads cooling fluid from the cooling fluid pump (3) to a first inlet (10c) at the valve (10). The second circuit (17) leads cooling fluid to a second inlet (10d) at the valve (10). In operating conditions in which the hydraulic retarder is not activated, the valve (10) blocks the second inlet (10d) and thus the circulation of cooling fluid through the second circuit at the same time that it receives cooling fluid from the first circuit (6) through the first inlet (10c).

10 Claims, 2 Drawing Sheets

(51) Int. Cl.
*F16K 11/085* (2006.01)
*F01P 7/14* (2006.01)

(52) U.S. Cl.
CPC ..... *F01P 2060/04* (2013.01); *F01P 2060/045* (2013.01); *F01P 2060/06* (2013.01); *F16K 11/0853* (2013.01)

(58) Field of Classification Search
USPC ....... 123/41.09, 41.08, 41.1, 41.02; 165/202, 165/41; 137/625.15
See application file for complete search history.

(56) References Cited

U.S. PATENT DOCUMENTS

| | | | | |
|---|---|---|---|---|
| 6,371,060 | B1* | 4/2002 | Lehmann | F01P 7/167 |
| | | | | 123/41.1 |
| 6,668,766 | B1* | 12/2003 | Liederman | F01P 5/12 |
| | | | | 123/198 C |
| 7,506,664 | B2* | 3/2009 | Norris | B60H 1/00485 |
| | | | | 137/625.17 |
| 8,800,503 | B2* | 8/2014 | Bohm | F01P 7/165 |
| | | | | 123/188.9 |
| 2002/0148691 | A1* | 10/2002 | Friedrich | B60T 1/087 |
| | | | | 188/296 |
| 2007/0131181 | A1* | 6/2007 | Vogelsang | B60T 10/02 |
| | | | | 123/41.1 |
| 2012/0234266 | A1* | 9/2012 | Faulkner | F01P 3/12 |
| | | | | 123/41.1 |
| 2012/0317968 | A1* | 12/2012 | Fudouji | B60T 5/00 |
| | | | | 60/468 |
| 2013/0333640 | A1* | 12/2013 | Kardos | F02B 29/0443 |
| | | | | 123/41.1 |

FOREIGN PATENT DOCUMENTS

| | | |
|---|---|---|
| EP | 2 587 017 A1 | 5/2013 |
| FR | 2 720 783 A1 | 12/1995 |
| FR | 2 808 305 A1 | 11/2001 |
| WO | WO 98/15726 | 4/1998 |
| WO | WO 03/042514 A1 | 5/2003 |

OTHER PUBLICATIONS

Written Opinion dated Feb. 20, 2015 issued in corresponding International patent application No. PCT/SE2014/051179.
International Preliminary Report on Patentability dated Jan. 22, 2016 issued in corresponding International patent application No. PCT/SE2014/051179.

* cited by examiner

COOLING SYSTEM IN A VEHICLE

CROSS-REFERENCE TO RELATED APPLICATIONS

The present application is a 35 U.S.C. §§ 371 national phase conversion of PCT/SE2014/051179, filed Oct. 8, 2014, which claims priority of Swedish Patent Application No. 1351265-2, filed Oct. 24, 2013, the contents of which are incorporated by reference herein. The PCT International Application was published in the English language.

BACKGROUND AND PRIOR ART

The present invention relates to a cooling system in a vehicle including an arrangement for controlling the circulation of fluid to different elements of the system.

Heavy vehicles are often equipped with one or several supplementary brakes in order to reduce wear on the ordinary wheel brakes of the vehicle. Such a supplementary brake may be a hydraulic retarder. Oil is used as the working medium in one type of hydraulic retarder. When the vehicle is braked with the aid of the retarder, the oil undergoes rapid heating. The hot oil is led to a heat exchanger where it is cooled by cooling fluid that circulates in the cooling system of the vehicle. The cooled oil is subsequently returned to the retarder for further use. In another type of hydraulic retarder, cooling fluid is used instead of oil as working medium in a retarder. In this case, the cooling fluid receives direct heating in the retarder.

The cooling system generally comprises a circuit in which the cooling fluid first cools the combustion engine and subsequently the retarder. In conditions in which the retarder is not activated, it does not generate any heat energy and thus does not need to be cooled. In such conditions, the cooling fluid receives instead a cooling effect when it is led through the heat exchanger or retarder. The cooling of the cooling fluid as it is led through the retarder or heat exchanger extends the period it takes for it to reach a desired operating temperature after a cold start. This cooling also makes it more difficult for the cooling fluid to be heated to a desired operating temperature on occasions when the vehicle is driven in cold surroundings. The continuous flow of cooling fluid through the retarder or heat exchanger results also in an extra fall in pressure in the cooling system.

WO 98/15726 reveals a cooling system in a vehicle with a circulating cooling fluid that cools a combustion engine and a retarder. On occasions when the retarder is not activated, cooling fluid can be led past the retarder through a bypass line. The cooling system comprises a conventional thermostat that leads cooling fluid to a cooler when it has a temperature that is higher than a regulation temperature, and to a return line without cooling when it has a temperature that is lower than the regulation temperature. The cooling fluid is circulated in the cooling system with a flow that can be varied, with the aid of one or several cooling fluid pumps. A control unit controls the flow of cooling fluid in the cooling system with the aid of the cooling fluid pump and possibly also a control valve, such that the temperature of the combustion engine does not exceed a pre-determined maximum temperature.

SUMMARY OF THE INVENTION

The aim of the present invention is to provide a cooling system in a vehicle for the cooling of a combustion engine and a hydraulic retarder, where the cooling of the retarder does not significantly influence the cooling system in a negative manner.

According to the invention, the cooling system uses a first circuit to cool the combustion engine and a second circuit to absorb, directly or indirectly, the heat that is produced in the retarder. The cooling fluid is thus led in parallel in the two circuits to a valve that replaces a conventional thermostat in the cooling system. Thus the valve comprises a separate inlet for the relevant circuits. The valve is designed such that during operation of vehicle, when the retarder is not activated, it is adapted to block the second inlet that is connected to the second circuit. The flow of cooling fluid through the second circuit can in this way be stopped in a simple and reliable manner. The valve in this case receives cooling fluid solely from the first circuit and through the first inlet. Thus the cooling fluid in the cooling system circulates in this case solely through the first circuit. The cooling fluid experiences in this way a shorter pathway on each cycle in the cooling system than if it must pass also through the heat exchanger or retarder. The presence of the heat exchanger or the retarder in the cooling system thus does not result in increased flow losses. The short pathway for the cooling fluid results also in it being possible to circulate a relatively small amount of cooling fluid in the cooling system, which promotes a rapid heating of the cooling fluid to a desired operating temperature after a cold start. The use of one and the same valve as both thermostat and to regulate the flow of cooling fluid through the second circuit results in the cooling system requiring few components. A cooling system of the type described above is therefore not significantly negatively affected by the fact that it comprises also a heat exchanger for the cooling of oil from a hydraulic retarder or for the direct cooling of the retarder.

According to one embodiment of the present invention, the valve is configured to lead received cooling fluid from the first circuit to a return line without it being cooled when it has a temperature that is lower than a pre-determined regulation temperature, and to the cooler to be cooled when it has a temperature that is higher than the pre-determined regulation temperature. Such a valve thus functions in the same manner as a conventional thermostat and the cooling fluid is led to the cooler only after it has been heated to a temperature that is higher than the regulation temperature. Thus, the cooling system has a function that corresponds to that of a conventional cooling system when the retarder is not activated.

According to one embodiment of the present invention, the valve is configured, in operating conditions in which the hydraulic retarder is activated, to block the first inlet and thus also the circulation of cooling fluid through the first circuit at the same time as it receives cooling fluid from the second circuit through the second inlet. When a retarder is activated, the supply of fuel to the combustion engine generally stops. The vehicle engine undergoes engine braking, and cold air is pumped through the combustion engine. Thus, the combustion engine requires essentially no cooling. For this reason, it is not necessary, either, to have a high flow of cooling fluid through the combustion engine. The flow of cooling fluid in the first circuit is blocked with the aid of the valve in a simple and efficient manner when the retarder is activated. In this case, cooling fluid is led to the valve solely through the second circuit. The flow losses of the cooling fluid are relatively low since it is not necessary in this case that the cooling fluid circulates through the relatively narrow cooling channels of the combustion engine.

According to one embodiment of the present invention, the valve is configured, in operating conditions in which the hydraulic retarder is activated, to reduce the circulation of cooling fluid through the first circuit at the same time as it receives cooling fluid from the second circuit through the second inlet. It may be appropriate under certain operating conditions to maintain a small flow of cooling fluid through the first circuit when the retarder is activated. The valve can here have a design that makes possible a reduced flow of cooling fluid through the first circuit. The valve can in this case have a design such that it does not block the first inlet completely, but allows a small amount of cooling fluid to pass through. As an alternative, the valve may be designed with a bypass line that leads a reduced amount of cooling fluid past the blocked first inlet. Such a bypass line can lead a reduced amount of cooling fluid from the first circuit to the valve through an extra inlet that is not blocked.

According to one embodiment of the present invention, the valve is configured, in operating conditions in which the hydraulic retarder is activated, to lead the received cooling fluid from the second circuit to the cooler to be cooled, independently of the temperature of the cooling fluid. The cooling system is generally placed under a heavy load when a retarder is activated, in particular if the retarder is activated for a long period in a long downhill section. It is, therefore, appropriate to lead the complete flow of cooling fluid through the cooler as soon as the retarder is activated.

According to one embodiment of the present invention, the cooling system comprises a control unit that is adapted to receive information from a brake unit that indicates whether the retarder is activated or not, and to control the valve with the aid of this information. The control unit may comprise a computer unit or a part of a computer unit that is provided with appropriate software for controlling the valve. The control unit may be configured to receive information from a temperature sensor concerning the temperature of the cooling fluid, to determine whether the cooling fluid has a temperature that is higher than the pre-determined regulation temperature, and to control the valve with the aid of this information. The regulation temperature may be a constant temperature. It is, however, possible that the control unit compares the temperature of the cooling fluid with a non-constant regulation temperature that differs between different operating conditions.

According to one embodiment of the present invention, the second circuit is configured to receive cooling fluid from a position in the first circuit that is located downstream of the cooling fluid pump and upstream of the cooling channels of the combustion engine. The two circuits are in this way arranged in connection with the pressurised side of the cooling fluid pump. When the valve blocks one of the circuits, cooling fluid is led from the pump through the remaining, open, circuit. It is in this way possible to ensure circulation of the cooling fluid through the first circuit and the second circuit with one and the same cooling fluid pump. Thus, the cooling system requires only one cooling fluid pump. The first circuit may comprise at least one further component, in addition to the combustion engine, that is cooled by the cooling fluid in the first circuit, and that the second circuit is adapted to receive cooling fluid from the first circuit in a position that is located upstream of the said further components. The cooling system may, for example, comprise a heat exchanger for the cooling of engine oil and a heat exchanger for the cooling of gearbox oil, before it cools the combustion engine. Since, in general, no combustion takes place in the combustion engine when the retarder is activated, less or no cooling of the engine oil or gearbox oil is required. At the same time, cooling fluid with an optimal low temperature can be led to the heat exchanger for the cooling of the retarder oil or it may be used as working medium in the retarder, since this cooling fluid is not used for the cooling of any component that is located upstream in the cooling system.

According to one embodiment of the present invention, the valve comprises a valve body that can be adjusted to different positions in which it blocks one of the inlets and one of the outlets at the same time, such that cooling fluid is led from the remaining non-blocked inlet to the non-blocked outlet. Such a valve can be arranged in a valve housing with an internal compartment that has a circular cross-section. The inlet and outlet can be arranged at different positions around the circular circumference of the valve housing. The valve body can here be placed into different rotational positions where it blocks one inlet and one outlet at a time, while at the same time opening a remaining inlet and outlet. Alternatively, the valve may comprise a valve body in the form of a displaceably arranged piston that can be displaced to different positions in which it blocks one of the inlets and one of the outlets at the same time. The valve may comprise also a valve body that is both rotatable and displaceable.

BRIEF DESCRIPTION OF DRAWINGS

A preferred embodiment of the invention will be described as an example below with reference to attached drawings, of which.

DETAILED DESCRIPTION OF A PREFERRED EMBODIMENT OF THE INVENTION

Figure 1:
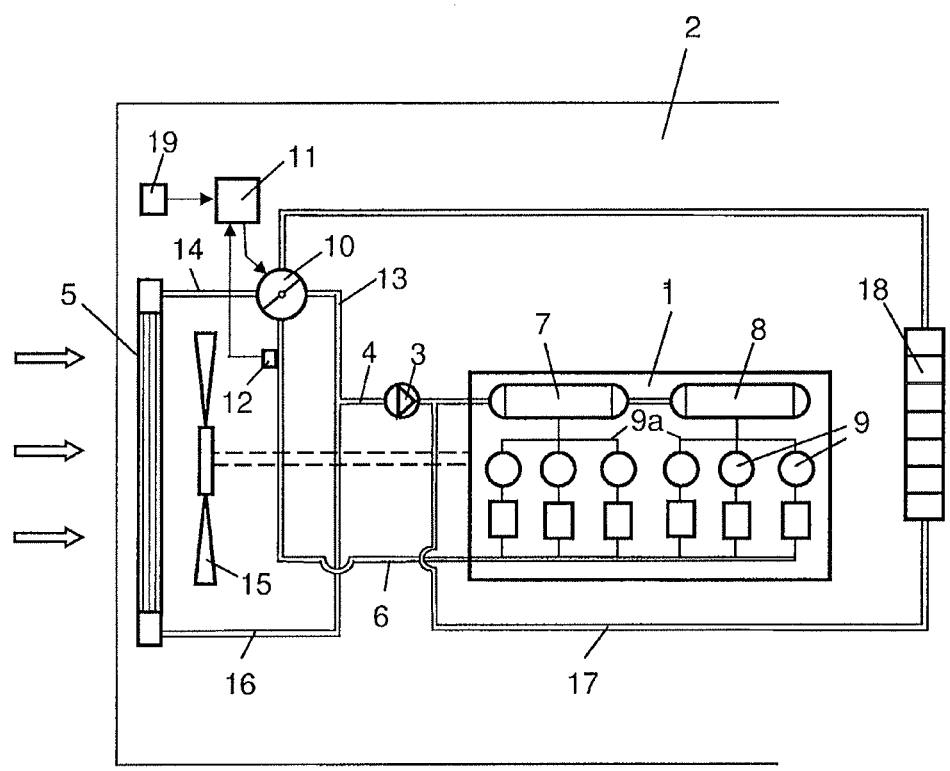
FIG. 1 shows a cooling system in a vehicle according to one embodiment of the invention.

FIG. 1 shows a cooling system for circulating a cooling fluid to cool a combustion engine 1 in a vehicle 2, shown schematically. The cooling fluid is circulated in the cooling system with the aid of a cooling fluid pump 3 that is arranged in an inlet line 4 to the combustion engine 1. The cooling fluid pump 3 may be driven in conventional manner by the combustion engine 1 using a suitable transmission, not shown in the drawings. The cooling fluid in the cooling system is cooled in cooler 5, which may be arranged at a front part of the vehicle 2. The cooling system comprises a first circuit 6 that comprises a part of the inlet line 4 that leads the cooling fluid from the cooling fluid pump 3 to the combustion engine 1. The first circuit 6 comprises after this a passage through a first heat exchanger 7 for the cooling of engine oil, and passage through a second heat exchanger 8 for the cooling of gearbox oil. The cooling fluid in the first circuit is subsequently led through cooling channels 6a in the combustion engine 1 for cooling of various parts and components of the combustion engine, such as regions in association with the cylinders 9 of the combustion engine.

The cooling fluid in the first circuit 6 is subsequently led to a valve 10. The valve 10 is controlled by a control unit 11. The control unit 11 receives information from a temperature sensor 12 that determines the temperature of the cooling fluid at an appropriate location in the first circuit 6. On occasions on which the temperature of the cooling fluid is lower than a regulation temperature, the valve 10 leads the cooling fluid to a first return line 13, which returns the cooling fluid to the cooling fluid pump 3 without it being cooled. On occasions on which the temperature of the cooling fluid is higher than a regulation temperature, the valve 10 leads the cooling fluid, via a line 14, to the cooler 5, to be cooled. The cooling fluid is here cooled by air that is led through the cooler 5 with the aid of a cooler fan 15. The cooled cooling fluid is led from the cooler 5, through a second return line 16, back to the inlet 4 and the cooling fluid pump 3.

The cooling system comprises a second circuit 17 that receives cooling fluid from the first circuit 6 at a position downstream of the cooling fluid pump 3 and upstream of the components that are cooled by the cooling fluid in the first circuit. The second circuit 17 thus receives cooling fluid from the first circuit 6 at a position upstream of the heat exchanger 7 for the cooling of engine oil, the heat exchanger 8 for the cooling of gearbox oil, and the cooling channels 6a in the combustion engine 1. The second circuit 17 leads the cooling fluid to a third heat exchanger 18 where the cooling fluid is configured to cool oil from a hydraulic retarder. The second circuit 17 then leads the cooling fluid to the valve 10. The control unit 11 receives information from a brake unit 19 that provides information about whether the retarder is activated or not. The valve 10 is designed such that it blocks the circulation of cooling fluid through the second circuit 17 when the retarder is not activated. Thus, all cooling fluid is in this case led from the cooling fluid pump 3 through the first circuit and the valve 10. The valve 10 is designed such that it blocks, or at least significantly reduces, the circulation of cooling fluid through the second circuit 17 when the retarder is activated. Thus, in this case all, or a principal part, of the cooling fluid is led from the cooling fluid pump 3 through the second circuit and the valve 10.

Figure 2A:
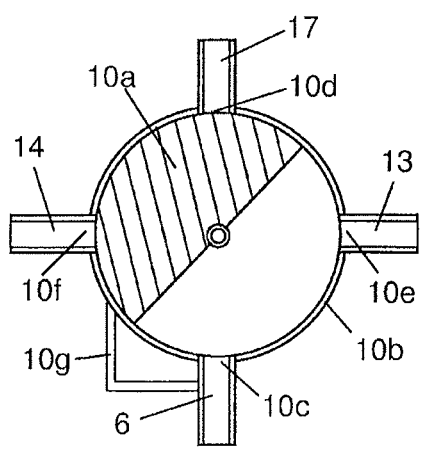
FIGS. 2a-c show the valve in FIG. 1 in three different conditions in different operating conditions.
Figure 2B:
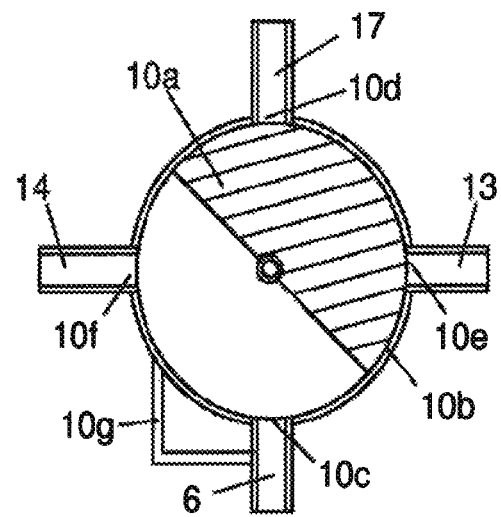
Figure 2C:
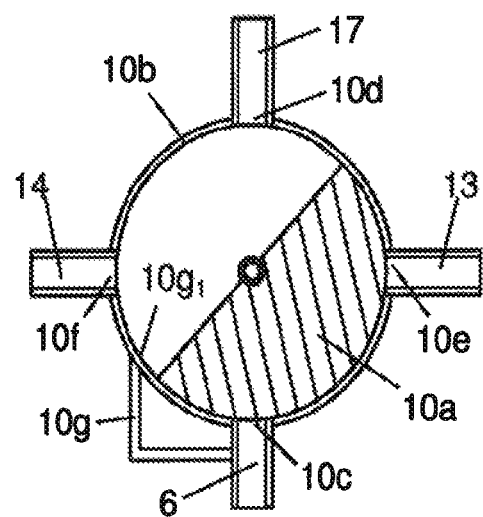

FIGS. 2a-c show an embodiment of a valve 10 that has the function described above. The valve 10 comprises a rotatable valve body 10a. The valve body 10a is constituted in this case by a semi-circular member. The valve body 10a is arranged in a cylindrical valve housing 10b with a circular peripheral wall. The valve housing 10b comprises a first inlet 10c in the circular wall for the reception of cooling fluid from the first circuit 6, and a second inlet 10d in the circular wall for reception of cooling fluid from the second circuit 17. The valve housing 10b comprises a second outlet 10f in the circular wall to lead cooling fluid to the line 14 and the cooler 5, and a first outlet 10e in the circular wall to lead cooling fluid to the first return line 13. The inlets 10c, 10d are arranged on opposing sides of the circular peripheral wall. The outlets 10e, 10f are arranged between the inlets 10c, 10d on opposing sides of the circular peripheral wall.

The cooling fluid pump 3 circulates cooling fluid around the cooling system during operation of the combustion engine 1. The control unit 11 receives information essentially continuously from the brake unit 19 that indicates whether the retarder is activated or not. When the control unit 11 receives information that indicates that the retarder is not activated, and when it receives information from the temperature sensor 12 that the cooling fluid has a temperature that is lower than the regulation temperature, it places the valve 10 into a first condition, shown in FIG. 2a. The valve body 10a blocks in the first condition the second inlet 10d, which is connected to the second circuit 17. The valve body 10a at the same time blocks the second outlet 10f, which is connected to the line 14. The valve in this way receives cooling fluid from the first circuit 6 through the first inlet 10c and leads it through the first outlet 10e to the first return line 13. Cooling fluid that has cooled engine oil in the first heat exchanger 7, gearbox oil in the second heat exchanger 8, and the combustion engine 1 is in this way led to the first return line 13. The cooling fluid is led in this way back to the inlet line 4 and the cooling fluid pump 3 without being cooled in the cooler 5. Since the valve body 10a blocks the second inlet 10d, the flow of cooling fluid through the second circuit 17 is completely stopped. A flow of cooling fluid through the second section of line 17 is not justified, since there is no hot oil from the retarder to be cooled in the third heat exchanger 18. There are several advantages to not leading the cooling fluid through the second section of line 17 when the retarder is not activated. The cooling fluid in this way does not undergo any cooling in the third heat exchanger 18, which is the case when there is no flow of hot oil through it. This has the advantage that the cooling fluid can experience a more rapid heating to a desired operating temperature after, for example, a cold start. Since it is not necessary to circulate the cooling fluid through the second circuit 17, it can be circulated around a relatively short pathway during one cycle in the cooling system. In this way, a relatively small amount of cooling fluid can circulate in the system, which results also in the advantage that the cooling fluid experiences a more rapid heating to a desired operating temperature after a cold start. Finally, lower flow losses are obtained, since it is not necessary to circulate the cooling fluid through the second circuit and the third heat exchanger 18.

When the control unit 11 receives information from the temperature sensor 12 that indicates that the cooling fluid has been heated to a temperature that is higher than the regulation temperature, the cooling fluid requires cooling. The control unit 11 places the valve body 10a into a second condition that is shown in FIG. 2b. The valve body 10a blocks in the second condition the second inlet 10d, which is connected to the second circuit 17. The valve body 10a at the same time blocks the first outlet 10e, which is connected to the first return line 13. The first inlet 10c, which receives cooling fluid from the first circuit 6, is, therefore, still open. The valve 10 in this case leads cooling fluid out from the first circuit 6, through the second outlet 10f, to the line 14 and the cooler 5. The cooling fluid is cooled in the cooler 5 by the air that the cooler fan 15 draws through the cooler 5 by suction. The cooled cooling fluid is subsequently led, through the second return line 16, back to the inlet line 4 and the cooling fluid pump 3. Also in this operating condition, the cooling fluid circulates around a shorter pathway for each cycle than is the case in a corresponding conventional cooling system, since it is not necessary to circulate it through the second circuit and the third heat exchanger 18. Thus, in this operating condition the cooling fluid can provide lower flow losses.

When the control unit 11 receives information from the brake unit 19 that indicates that the retarder has been activated, it places the valve 10 into a third condition, which is shown in FIG. 2c. The valve body 10a in the third condition blocks the first inlet 10c, which is connected to the first circuit 6. The circulation of cooling fluid through the first circuit 6 in this way stops. Since the injection of fuel into a combustion engine 1 normally stops when a retarder is activated, the combustion engine 1, the engine oil in the first heat exchanger 7, and the gearbox oil in the second heat exchanger 8 do not require essentially any cooling. The valve body 10a at the same time blocks the first outlet 10e, which is connected to the first return line 13. The cooling fluid is in this case led out, through the second outlet 10f, to the line 4 and the cooler 5 in order to be cooled.

Cooling fluid is thus led directly to the cooler 5 in order to be cooled as soon as the retarder is activated. When a hydraulic retarder is activated, it results in most cases in a heavy load being placed on the cooling system. In those cases in which the cooling fluid has a temperature that is lower than the regulation temperature, it is not necessary in this case to wait for the temperature of the cooling fluid to rise to the regulation temperature before the cooling fluid is led to the cooler 5. The cooler 5 is in this way not exposed to the same thermal load as it is when it suddenly, in a cold condition, must receive a large flow of very hot cooling fluid. Also in this case the cooling fluid experiences a shorter pathway for each cycle than it does in a corresponding conventional cooling system, since it is not necessary to lead the cooling fluid through the first circuit. The cooling fluid can in this way experience relatively low flow losses, since it is not necessary that it circulates through the relatively narrow cooling channels of the combustion engine 1.

It may, however, be appropriate in certain cases to maintain a small flow of cooling fluid through the first circuit 6 on occasions when the retarder is activated. For this reason, the valve 10 can be equipped with a bypass line 10g that leads a reduced flow of cooling fluid from the first circuit 6 into the valve 10 through an extra inlet $10g_1$. The reduced amount of cooling fluid from the first circuit is in this case mixed with the cooling fluid from the second circuit 17, after which the cooling fluid is led out, through the second outlet 10f, to the line 4 and the cooler 5. FIG. 2c shows the valve body in a condition in which it opens the extra inlet $10g_1$. The valve body 10a can, however, be further rotated in a clockwise direction through some degrees to a condition in which it blocks also the extra inlet $10g_1$, in addition to it blocking the first inlet 10c and the first outlet 10e. The complete cooling fluid flow in the first circuit 6 is blocked in this condition.

In the embodiment of the cooling system described above, it cools the oil that is used as working medium in a hydraulic retarder in a heat exchanger. Naturally, the cooling system can be used also for hydraulic retarders of the type that uses cooling fluid as working medium. The cooling fluid in this case is led through the retarder, instead of the heat exchanger 18.

The invention is not in any way limited to the embodiment that has been described in the drawings: it can be freely varied within the scope of the patent claims. The valve may have an essentially freely chosen design, but it must have the function described above.

The invention claimed is:

1. A cooling system in a vehicle, wherein the vehicle includes a combustion engine, and wherein the cooling system comprises:
   a cooling fluid pump configured and operable to circulate cooling fluid in the cooling system, a cooler for cooling the cooling fluid, and a valve that is configured and operable to lead cooling fluid to the cooler for cooling or to a return line without cooling;
   a first circuit comprising cooling channels configured and operable for cooling of the combustion engine, said first circuit being configured and operable for leading cooling fluid in a circulating fluid direction from the cooling fluid pump to a first inlet at the valve;
   a second circuit configured and operable for the cooling of a hydraulic retarder, the second circuit being configured and operable to lead cooling fluid to a second inlet at the valve;
   the second circuit being configured and operable to receive cooling fluid from the first circuit at a receiving position that is located downstream, in the circulating fluid direction, of the cooling fluid pump and upstream of the cooling channels of the combustion engine; and
   the valve is configured and operable to block, in operating conditions in which the hydraulic retarder is not activated, the second inlet and thus to block the circulation of cooling fluid through the second circuit at the same time that the valve receives cooling fluid from the first circuit through the first inlet.

2. The cooling system according to claim 1, wherein the valve is configured and operable to lead the received cooling fluid from the first circuit to the return line without the cooling fluid being cooled when it has a temperature lower than a pre-determined regulation temperature, and to lead the cooling fluid to the cooler to be cooled when the cooling fluid has a temperature that is higher than the pre-determined regulation temperature.

3. The cooling system according to claim 1, wherein the valve is configured and operable, in operating conditions in which the hydraulic retarder is activated, to block the first inlet, and thus also the circulation of cooling fluid through the first circuit situated downstream from the position where the second circuit receives the cooling fluid, at the same time as the valve receives cooling fluid from the second circuit through the second inlet.

4. The cooling system according to claim 1, wherein in operating conditions in which the hydraulic retarder is activated, the valve is configured and operable to reduce the circulation of cooling fluid through the first circuit situated downstream from the position where the second circuit receives the cooling fluid, at the same time as the valve receives cooling fluid from the second circuit through the second inlet.

5. The cooling system according to claim 3, wherein the valve is configured and operable to lead the received cooling fluid from the second circuit to the cooler to be cooled, independently of the temperature of the cooling fluid.

6. The cooling system according to claim 1, wherein the cooling system comprises a control unit that is configured and operable to receive information from a brake unit of the vehicle that indicates whether the retarder is activated or not, and to control the valve with the aid of this information.

7. The cooling system according to claim 1, further comprising:
   a control unit configured and operable to receive information from a temperature sensor concerning the temperature of the cooling fluid, to determine whether the cooling fluid has a temperature that is higher than the pre-determined regulation temperature, and to control the valve with the aid of this information.

8. The cooling system according to claim 1, wherein the first circuit comprises at least one further component, in addition to the combustion engine, that is cooled by the cooling fluid in the first circuit,
   wherein the second circuit is configured and operable to receive the cooling fluid from the first circuit at a position that is located upstream of the at least one further component.

9. The cooling system according to claim 1, wherein the valve comprises a valve body configured and operable to be adjusted to a first position and to a second position different from the first position,
   wherein in the first position the valve body blocks one of the inlets and one of the outlets of the valve at the same time, such that cooling fluid is led from the remaining non-blocked inlet to the non-blocked outlet, and
   wherein in the second position the valve body blocks the remaining inlet and the remaining outlet.

10. The cooling system according to claim 8, wherein the at least one further component is a heat exchanger configured to cool engine oil for the combustion engine.

\* \* \* \* \*